(12) United States Patent
Woerner et al.

(10) Patent No.: US 7,836,688 B2
(45) Date of Patent: Nov. 23, 2010

(54) EXHAUST SYSTEM

(75) Inventors: Siegfried Woerner, Esslingen (DE); Rudolf Buhmann, Esslingen (DE); Rainer Lehnen, Stuttgart (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 0 days.

(21) Appl. No.: 11/439,768

(22) Filed: May 24, 2006

(65) Prior Publication Data

US 2006/0266022 A1    Nov. 30, 2006

(30) Foreign Application Priority Data

May 30, 2005    (DE) .................. 10 2005 025 045

(51) Int. Cl.
*F01N 3/00* (2006.01)
(52) U.S. Cl. .................. 60/297; 60/286; 60/295; 60/301; 60/303; 60/311
(58) Field of Classification Search ............ 60/286, 60/295, 297, 301, 303, 311
See application file for complete search history.

(56) References Cited

U.S. PATENT DOCUMENTS

| | | | | | |
|---|---|---|---|---|---|
| 4,830,833 | A | * | 5/1989 | Shaff | 422/172 |
| 5,145,215 | A | * | 9/1992 | Udell | 285/49 |
| 5,203,166 | A | * | 4/1993 | Miller | 60/274 |
| 5,517,820 | A | * | 5/1996 | Kuroda et al. | 60/274 |
| 5,887,750 | A | | 3/1999 | Popp et al. | |
| 6,554,321 | B1 | | 4/2003 | Boisseau et al. | |
| 6,722,124 | B2 | * | 4/2004 | Pawson et al. | 60/286 |
| 2003/0190269 | A1 | * | 10/2003 | Liu et al. | 422/168 |
| 2003/0209011 | A1 | * | 11/2003 | Duvinage et al. | 60/286 |
| 2003/0221424 | A1 | | 12/2003 | Woerner et al. | |
| 2006/0213197 | A1 | * | 9/2006 | Caro et al. | 60/685 |

FOREIGN PATENT DOCUMENTS

| | | |
|---|---|---|
| DE | 3412289 | 10/1985 |
| DE | 19636747 | 3/1998 |
| DE | 19728655 | 2/1999 |
| DE | 19939807 | 3/2001 |
| DE | 10018792 | 9/2001 |
| DE | 10128414 | 12/2002 |
| DE | 101 40 295 A1 | 3/2003 |
| DE | 10243270 | 3/2004 |

(Continued)

OTHER PUBLICATIONS

International Search Report dated Feb. 26, 2001 for related PCT Application No. PCT/GB 00/04660.

(Continued)

*Primary Examiner*—Thomas E Denion
*Assistant Examiner*—Diem Tran
(74) *Attorney, Agent, or Firm*—Howard IP Law Group, PC

(57) ABSTRACT

The present invention relates to an exhaust system for an internal combustion engine, in particular in a motor vehicle, having an SCR module containing at least one SCR catalyst element in an SCR housing connected to an exhaust line and having a PF module containing at least one particulate filter element in a PF housing connected to the exhaust line upstream from the SCR housing.

24 Claims, 1 Drawing Sheet

FOREIGN PATENT DOCUMENTS

| | | |
|---|---|---|
| DE | 101 64 833 A1 | 6/2004 |
| DE | 202005008146 | 9/2005 |
| EP | 057968 | 4/1993 |
| EP | 0783918 | 7/1997 |
| EP | 1242722 | 9/2002 |
| EP | 1270889 | 1/2003 |
| EP | 1273338 | 1/2003 |
| EP | 1 321 642 A1 | 6/2003 |
| EP | 1321641 | 6/2003 |
| EP | 1395351 | 3/2004 |
| JP | 54131569 | 10/1979 |
| JP | 9053772 | 2/1997 |
| JP | 2005-113795 * | 4/2005 |
| WO | WO/01/42633 | 6/2001 |
| WO | WO/02/100519 | 12/2002 |
| WO | WO/2004/069388 | 8/2004 |

OTHER PUBLICATIONS

International Search Report dated Sep. 3, 2002 for related PCT Application No. PCT/EP 02/04040.

International Search Report dated May 12, 2004 for related PCT Application No. PCT/EP 03/13918.

European Search Report dated Sep. 4, 2006 for related EP Application No. EP 06 11 1902.

* cited by examiner

EXHAUST SYSTEM

FIELD OF THE INVENTION

The present invention relates to an exhaust system for an internal combustion engine, in particular in a motor vehicle. The invention also relates to a modular system for constructing such an exhaust system.

BACKGROUND OF THE INVENTION

To reduce emission of pollutants by internal combustion engines, exhaust systems of internal combustion engines have been equipped with exhaust treatment facilities. Such an exhaust treatment system is, for example, an SCR catalyst, where SCR stands for selective catalyst reduction. SCR catalysts are used reduce nitrogen oxides ($NO_x$) with the help of urea. In addition, there are known exhaust treatment facilities designed as particulate filters. Particulate filters are used mainly with diesel engines so that particles entrained in the exhaust can be separated from the exhaust.

The present invention relates to the problem of providing an improved embodiment of an exhaust system characterized in particular in that it can be adapted especially easily to different specifications for emission values to be maintained.

SUMMARY OF THE INVENTION

The invention is based on the general idea of constructing the exhaust system as a modular system so that the exhaust system has at least one first module, e.g., an SCR module and one second module, e.g., a PF module, where PF stands for particulate filter. These modules form separate and independent units, each being manufactured separately and installed separately in the exhaust system. The exhaust system has a modular design that provides a high flexibility with regard to its adaptability to different emission requirements. For example, if separation of particles from the exhaust is not necessary for a certain application, e.g., in a gasoline engine or an engine that runs on natural gas, then the PF module may be omitted, for example, or modified so that it functions as a muffler, for example. Likewise in other applications in which production of nitrogen oxides is comparatively low, the SCR module may be omitted; likewise, the SCR module may be modified so that instead of SCR catalyst elements, it contains elements to reduce the number of particles, so that the SCR module may also be used for particle separation from the exhaust in addition or as an alternative to the PF module.

In addition, the exhaust system having a modular design offers the possibility of simple retrofitting or upgrading of the individual modules and/or the exhaust system as a whole.

Additional important features and advantages of the present invention are derived from the subclaims, the drawing and the respective description of the figures with reference to the drawings.

It is self-evident that the features mentioned above and those yet to be explained below can be used not only in the particular combination given but also in other combinations or alone without going beyond the scope of the present invention.

BRIEF DESCRIPTION OF THE FIGURES

A preferred exemplary embodiment of the present invention is depicted in the drawing and explained in greater detail in the following description.

DETAILED DESCRIPTION OF THE PREFERRED EMBODIMENTS

Figure 1:
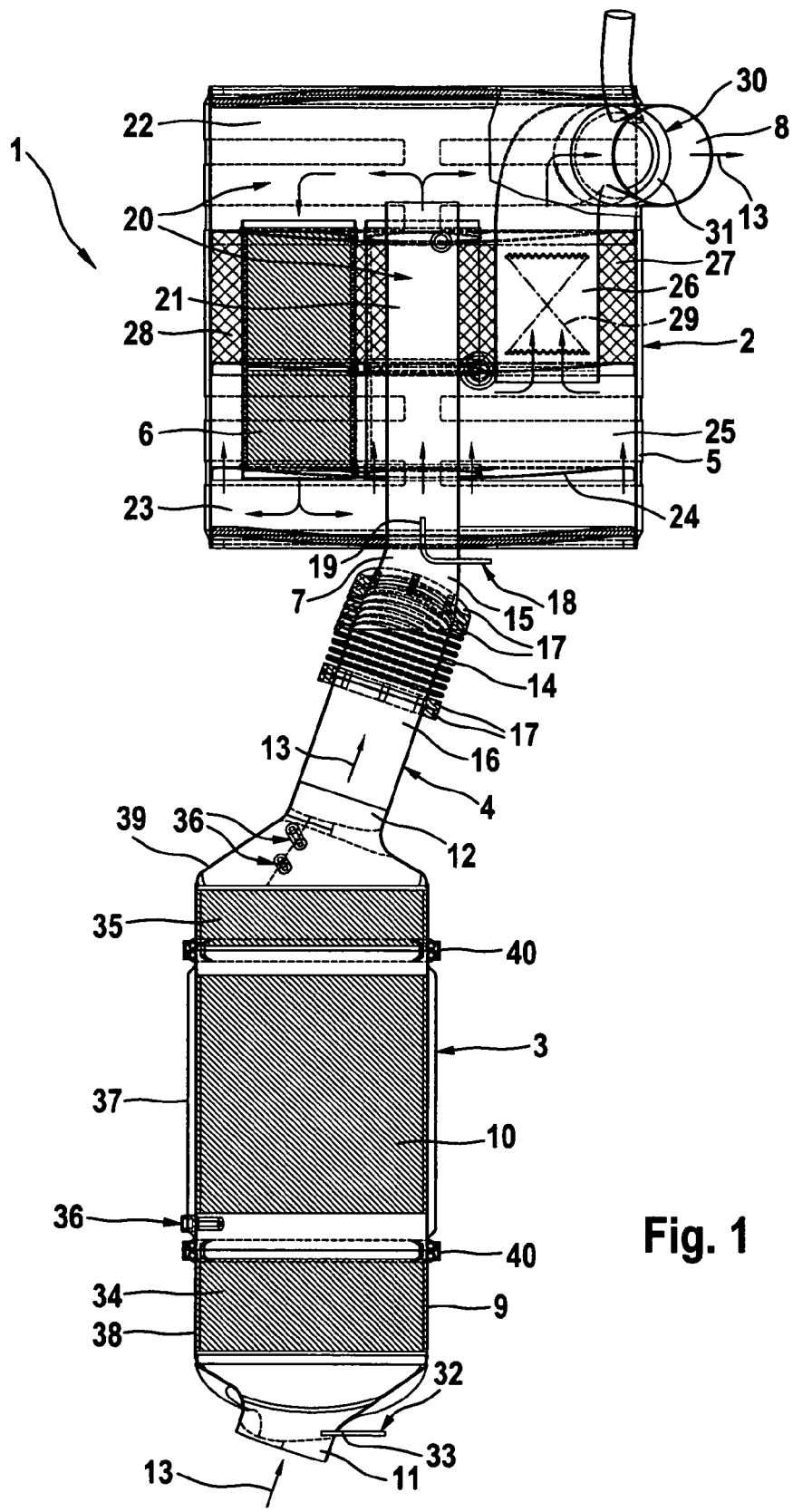
FIG. 1, the sole FIGURE, shows a partially sectional side view of a special embodiment of an exhaust system according to an embodiment of the invention.

FIG. 1 shows an inventive exhaust system 1 for an internal combustion engine (not shown), in particular in a motor vehicle. The inventive exhaust system 1 is preferably used in diesel engines in commercial vehicles such as buses and trucks.

Exhaust system 1 can be constructed as an inventive modular system. This modular system includes a first module 2 and a second module 3 and at least one connecting pipe 4. The first module 2 has a first housing 5 in which at least one first exhaust treatment element 6 is arranged. The first housing 5 has a first exhaust inlet 7 and a first exhaust outlet 8 through which the first housing 5 can be connected to an exhaust line (not shown) of the exhaust system 1. This exhaust line carries the exhaust gases of the internal combustion engine away from the engine and into the environment.

The modular system includes different variants for the first exhaust treatment element 6 which can be installed alternatively and in particular replaceably in the first housing 2 in construction of the first module 2 and/or the exhaust system 1. The variants of the first exhaust treatment element 6 may include, for example, an SCR catalyst element and a PM catalyst element, where PM stands for particle minimizing. A PM catalyst element is an element that acts to minimize particles as the exhaust flows through the element and it works with open channels. The particles entrained in the exhaust gas flow settle on the walls of the channels of the PM catalyst element without there being any risk of blockage of the channels of the PM catalyst element. In the case of catalytically active channel walls, oxidation of the deposited particles occurs under certain conditions. In this way, passive regeneration of the PM catalyst element is possible continuously.

The first module 2 may thus be designed as an SCR module or as a particle minimizing module as a function of the variants selected for the first exhaust treatment element 6.

The second module 3 has a second housing 9 which functions at least to receive at least one second exhaust treatment element 10. In addition, the second housing 9 has a second exhaust inlet 11 and a second exhaust outlet 12 through which the housing 9 can be connected to the exhaust line.

For the second exhaust treatment element 10, the modular system also includes several different variants which can be installed alternatively and preferably replaceably in the second housing 9. These variants of the second exhaust treatment element 10 include, for example, a wall-flow particulate filter element. In contrast with a PM catalyst element, a wall-flow particulate filter element has closed channels so that the exhaust stream is forced to flow through porous channel walls. The particles are filtered out in the process and are incorporated into the wall material. This causes the wall-flow particulate filter element to gradually become clogged so it must be regenerated continuously or at intervals. In comparison with a PM catalyst element, a wall-flow particulate filter element has the disadvantage that its flow resistance can fundamentally increase drastically but as a rule the separation effect for particles in a wall-flow particulate filter element is much greater than with a PM catalyst element. In addition, the variants of the second exhaust treatment element may be a PM catalyst element and/or a muffler element and/or an oxidation catalyst element.

With the help of the connecting pipe 4, the two modules 2, 3 can now be joined together by having the connecting pipe 4 connect the second exhaust outlet 12 to the first exhaust inlet 7. FIG. 1 shows an exhaust flow, represented by arrows 13, flowing through the exhaust system 1 during operation of the internal combustion engine. Thus the first module 2 is preferably situated downstream from the second module 3 in the exhaust line.

In the preferred embodiment shown here, the first module 2 is designed as an SCR module. In the exemplary embodiment shown here, the first exhaust treatment element 6 is preferably an SCR catalyst element. The same thing is also true of the first housing 5, which is also referred to as the SCR housing 5. The respective SCR catalyst element 6 may be, for example, a vanadium-based catalyst or a vanadium-free catalyst or a suitably coated carrier, e.g., made of cordierite or metal or may be designed as a solid extruded element. In addition, a cross-mixing effect can be achieved through a special structure of the substrates, in particular the metal substrates, thereby improving the distribution and thorough mixing of the reducing agent over the cross section of the catalyst. As a result of this cross-mixing, the $NO_x$ reduction in the SCR catalyst element 6 can be improved while on the other hand the amount of urea flowing through the SCR catalyst element 6 without reacting can be decreased.

Furthermore, the second module 3 in the preferred embodiment shown here is a PF module. PF here stands for particulate filter. Accordingly, the second housing 9 is also referred to as the PF housing 9. The second exhaust treatment element 10 is accordingly a particulate filter element. The term particulate filter here includes any equipment which has a particle-reducing or particle minimizing effect in its flow through the filter. In particular, the term particulate filter element thus includes the wall-flow particulate filter elements described above as well as the PM catalyst elements. The particulate filter element 10, designed as a wall-flow particulate filter element, may optionally be made of cordierite, sintered metal, silicon carbide or some other suitable filter material.

The illustrated, inventive exhaust system 1 thus includes the SCR module 2 and the PF module 3 situated upstream from it, whereby the two modules 2, 3 are interconnected via the connecting pipe 4.

The two modules 2, 3 of the modular system are coordinated with regard to their function and operation, so that the two modules 2, 3 are preferably being used simultaneously and are built into one exhaust system 1. However, the individual modules 2, 3 are essentially designed so that they can also be installed independently and without the respective other module 2, 3 in an exhaust system 1 to implement an exhaust purification system for which the exhaust standards are not as strict. However, it is especially advantageous that the respective missing module 2, 3 can be retrofitted at any time to implement in this way the cleaning system equipped with the two modules 2, 3 in the respective exhaust system 1.

The connecting pipe 4 preferably has at least one uncoupling element 14 which is designed so that the two housings 5, 9 are mechanically separated from one another. In this way, the two housings 5, 9 can execute relative movements to one another without damaging the connecting pipe 4 or one of the housings 5, 9. Such relative movements may occur during operation of the vehicle equipped with exhaust system 1. Likewise, the uncoupling element 14 can compensate for thermal expansion effects which occur because the exhaust system 1 can expand due to the high temperatures that occur during operation.

Decoupling element 14 may be, for example, a flexible corrugated pipe, which is inserted here into the connecting pipe 4. Accordingly, the decoupling element 14, i.e., the corrugated pipe is situated between two sections 15, 16 of the connecting pipe 4 adjacent thereto. Owing to the high temperatures to be expected, the corrugated pipe (decoupling element 14) is preferably made of a suitable metal. The corrugated pipe 14 is connected to the sections 15, 16 of the connecting pipe 4 by round flange 17.

The SCR module 2 here comprises a urea metering device 18 with the help of which urea can be introduced into the exhaust stream 13 upstream from the at least one SCR catalyst element 6. Of the urea metering device 18, only one fuel injector 19 for introducing the urea is shown here, arranged in the area of the first exhaust inlet 7. The SCR module 2 also has a mixing zone 20 in the SCR housing 5, extending between the point of introduction of the urea, i.e., between the fuel injector 19 and the at least one SCR catalyst element 6 in the SCR housing 5. This mixing zone 20 here includes and inlet pipe 21 and an inlet chamber 22. The inlet pipe 22 connects the first exhaust inlet 7 to the inlet chamber 22 inside the SCR housing 5. At least one passive mixing element (not shown here) may be arranged in the mixing zone 20, i.e., in particular in the inlet pipe 21 and/or in the inlet chamber 22; as the flow passes through or around this passive mixing element, it produces an intense and thorough mixing of the urea thereby introduced with the exhaust flow 13.

The exhaust gases thus go from the first exhaust inlet 7 through the inlet pipe 21 into the inlet chamber 22. The exhaust gases go from the inlet chamber 22 through the at least one SCR catalyst element 6 into a collecting chamber 23. The collecting chamber 23 is separated from the outlet chamber 25 by a gas-permeable partition 24. The gas permeability of this partition 24 is achieved, for example, through appropriate through-openings and/or through a porous design of the partition 24. From the outlet chamber 25 the exhaust flow 13 passes through an outlet pipe 26 and goes to the first exhaust outlet 8.

In addition, the SCR housing 5 here additionally has a muffler chamber 27 containing a muffler material 28 arranged between the inlet chamber 22 and the outlet chamber 25. The outlet pipe 26, the inlet pipe 21 and the at least one SCR catalyst element 6 pass through this muffler chamber 27. The outlet pipe 26 is designed to be permeable for airborne sound within the muffler chamber 27. For example, a section of the outlet pipe 26 running inside the muffler chamber 27 here is therefore provided with perforations 29. In the exemplary embodiment shown here, only one SCR catalyst 6 is clearly discernible, but the SCR module 2 expediently contains multiple SCR catalyst elements 6 which are arranged parallel to one another and through which the exhaust stream 13 can flow in parallel.

Finally, the SCR module 2 may be equipped with a sensor (not shown here) which is designed in particular so that a temperature, an $NO_x$ content and an $NH_3$ content can be measured with it in the exhaust stream 13.

In the preferred embodiment shown here, the SCR module 2 also includes an exhaust cooling device 30. The exhaust cooling device 30 is situated downstream from the at least one SCR catalyst element 6 and serves to cool the exhaust gases coming from the first exhaust outlet 8. The exhaust cooling device 30 is preferably installed in the area of the outlet pipe 26. The exhaust cooling device 30 may therefore have a nozzle array 30 which is installed in the outlet pipe 26. The nozzle array 31 may be designed as a ring nozzle and may in particular be integrated into a wall of the outlet pipe 26. Through the nozzle array 31, a suitable coolant can be introduced into the exhaust stream 13. The coolant is preferably ambient air. Likewise, however, other coolants are also conceivable.

Alternatively, the exhaust cooling device 30 may also be equipped with a cooling channel through which a coolant flows. This cooling channel may be connected, e.g., to a wall of the outlet pipe 6 in a manner suitable for heat transfer or it may be connected to or integrated into this wall. For example, the coolant may then be a liquid coolant; the cooling channel may in particular be connected to a cooling circuit of the internal combustion engine.

The PF module 3 may be equipped with a fuel metering device 32, of which only one fuel injector 33 is shown here. With the help of the fuel metering device 32, a fuel such as the fuel burned in the internal combustion engine, can be introduced into the exhaust stream 13 upstream from the at least one particulate filter element 10. A fuel feed is needed in particular when the temperature of the particulate filter element 10 must be raised to a starting temperature at which burn up of the particle burden on the particulate filter element 10 begins in order to initiate active regeneration of the particulate filter element 10. In order for the fuel thereby introduced to be able to release the desired heat by oxidation, the particulate filter element 10 may be designed to be catalytically active. However, the preferred embodiment is the one shown here in which at least one pre-oxidation catalyst element 34 is arranged in the PF housing 9 upstream from the at least one particulate filter element 10. Then the fuel is introduced upstream from this pre-oxidation catalytic element 34.

The at least one pre-oxidation catalytic element 34 thus serves as a catalytic burner during active regeneration of the particulate filter element 10. In addition, the pre-oxidation catalyst element 34 may also function as a conventional oxidation catalyst. Furthermore, it may serve as an $NO_2$ catalyst to support continuous regeneration of the particulate filter element 10. On the whole, the pre-oxidation catalyst element 34 allows an improvement in the NO-absorbing effect of the SCR module 2.

In addition, the PF module 3 may have at least one post-oxidation catalyst element 35, as in the present case, which is arranged downstream from the at least one particulate filter element 10 in the PF housing 9. With the help of the post-oxidation catalyst element 35, fuel residues which have not been reacted at all or completely can be oxidized when the particle element 10 is heated. The at least one post-oxidation catalyst element 35 may also contribute to an improvement in functioning of the SCR module 2.

In addition, the PF module 3 may be equipped with a sensor 36 with the help of which the temperature in the exhaust stream 13 can be measured and/or a differential pressure measurement can be performed on the at least one particulate filter element 10. Then the load status of the particulate filter element 10 can be determined on the basis of the differential pressure measurement.

The PF housing 9 preferably has a central section 37 which is situated between and inlet section 38 and an outlet section 39. The inlet section 38 includes the second exhaust inlet 11 and may additionally, as in the present case, include the at least one pre-oxidation catalyst element 34. In contrast with that, the outlet section 39 has the second exhaust outlet 12 and may also contain the at least one post-oxidation catalyst element 35. The central section 37 contains the at least one particulate filter element 10 and is mounted replaceably with the help of fastening elements 40 on the inlet section 38 and on the outlet section 39. In this way, a damaged or spent particulate filter element 10 can be replaced especially easily by a new one because the central section 37 can be dismantled especially easily without having to remove the entire PF module 3 from the exhaust system 1. Furthermore, the particulate filter element 10 can also be retrofitted especially easily in the case of the PF module 3, e.g., converted from a wall flow particulate filter element a PM catalyst element or vice versa.

The fastening elements 40 are designed here as quick-acting fastening elements. Fastening elements 40 designed as hose clamps are shown here, designed with outwardly projecting bulge-like edge areas on the end faces of the sections 37, 38, 39 to be joined together.

In addition, the SCR housing 5 and the PF housing 9 may also be designed as a muffler, e.g., through the use of double walls with insulating material in between.

What is claimed is:

1. An exhaust system for an internal combustion engine of a motor vehicle, comprising:
    a selective catalyst reduction (SCR) module having at least one SCR catalyst element in an SCR housing being connected to an exhaust line;
    a particulate filter (PF) module having at least one particulate filter element in a PF housing being connected to the exhaust line upstream from the SCR housing,
    a pipe connecting an exhaust outlet of the PF housing to an exhaust inlet of the SCR housing; and
    a first and a second quick-acting fastening element,
    wherein the PF housing has a central section arranged between an inlet section having an exhaust inlet and an outlet section having an exhaust outlet, said central section being replaceably mounted on the inlet section and the outlet section by said first and second quick-acting fastening elements and containing the at least one particulate filter element,
    wherein the PF module in the PF housing contains at least one pre-oxidation catalyst element being arranged upstream from the at least one particulate filter element,
    wherein the PF module in the PF housing contains at least one post-oxidation catalyst element being arranged downstream from the at least one particulate filter element,
    wherein the SCR housing contains a muffler chamber filled with muffler material, said muffler chamber being arranged between an inlet chamber and an outlet chamber.

2. The exhaust system according to claim 1, further comprising a fuel-metering device for introducing a fuel into the exhaust stream upstream from the at least one particulate filter element.

3. The exhaust system according to claim 1, wherein the PF module further comprises a sensor for measuring at least one of temperature and a pressure difference associated with the at least one particulate filter element.

4. The exhaust system according to claim 1, said first and second quick-acting fastening elements comprise a first and a second hose clamp,
    wherein, said inlet section and outlet section comprise a first and a second outwardly projecting bulge-like circumferential edge area at a first end face of said inlet section and at a second end face of said outlet section respectively,
    wherein said central section comprises a third and a fourth outwardly projecting bulge-like circumferential edge area at a third and a fourth end face of said central section,
    wherein said first hose clamp joins the third end face of said central section to the first end face of said inlet section by clamping the first and third outwardly projecting bulge-like circumferential areas together, and wherein said second hose clamp joins the fourth end face of said central section to the second end face of said outlet section by clamping the fourth and second outwardly projecting bulge-like circumferential areas together.

5. The exhaust system according to claim 1, wherein the SCR module has a urea metering device for introducing urea into the exhaust stream upstream from the at least one SCR catalyst element.

6. The exhaust system according to claim 1, wherein the SCR module in the SCR housing has a mixing zone between a urea introduction point and the at least one SCR catalyst element.

7. The exhaust system according to claim 1, wherein the SCR module contains multiple SCR catalyst elements arranged in the SCR housing so that flow passes through them in parallel.

8. The exhaust system according to claim 1, wherein the SCR module has a sensor for measuring at least one of temperature, $NO_x$, and $NH_3$ in the exhaust stream.

9. The exhaust system according to claim 1, wherein the connecting pipe comprises at least one decoupling element for mechanical decoupling of the SCR and PF housings.

10. The exhaust system according to claim 9, wherein the decoupling element comprises a flexible corrugated pipe.

11. The exhaust system according to claim 10, wherein the flexible corrugated pipe is inserted into the connecting pipe between two adjacent sections of the connecting pipe.

12. The exhaust system according to claim 10, wherein the corrugated pipe is made of metal.

13. The exhaust system according to claim 10, wherein the corrugated pipe is connected to adjacent sections of the connecting pipe by a round flange.

14. The exhaust system according to claim 1, wherein the SCR module has an inlet pipe in the SCR housing connecting an exhaust inlet of the SCR housing to an inlet chamber of the SCR housing.

15. The exhaust system according to claim 14, wherein the at least one SCR catalyst element connects the inlet chamber to a collecting chamber of the SCR housing.

16. The exhaust system according to claim 15, wherein the SCR module has an outlet pipe in the SCR housing connecting an exhaust outlet of the SCR housing to an outlet chamber or to the collecting chamber.

17. The exhaust system according to claim 1, wherein at least one of the at least one SCR catalyst element, an outlet pipe and an inlet pipe are passed through the muffler chamber.

18. The exhaust system according to claim 17, wherein the outlet pipe is permeable for airborne sound in a section running in the muffler chamber.

19. The exhaust system according to claim 17, wherein the outlet pipe comprises perforations in the section running in the muffler chamber.

20. The exhaust system according to claim 1, wherein the SCR module has an exhaust cooling device arranged downstream from the at least one SCR catalyst element.

21. The exhaust system according to claim 20, wherein the exhaust cooling device has a cooling channel through which coolant can flow, said channel being connected to or integrated with a wall of an outlet pipe in a manner suitable for transfer of heat.

22. The exhaust system according to claim 20, wherein the exhaust cooling device has a nozzle array that is arranged in or integrated with a wall of the outlet pipe so that a coolant can be introduced through the nozzle array into the exhaust stream.

23. A modular system for constructing an exhaust system for an internal combustion engine of a motor vehicle, comprising:

a first module having a first housing receiving at least one first exhaust treatment element, wherein the first housing can be connected to an exhaust line of the exhaust system via a first exhaust inlet and a first exhaust outlet;

a second module having a second housing receiving at least one second exhaust treatment element, wherein the second housing can be connected to the exhaust line via a second exhaust inlet and a second exhaust outlet upstream from the first housing;

a connecting pipe for connecting the second exhaust outlet to the first exhaust inlet; and a first and a second quick-acting fastening element, wherein, various first exhaust treatment elements can be installed alternatively and replaceably in the first housing, at least one of the first exhaust treatment elements being a selective catalyst reduction (SCR) catalyst element and at least another of the first exhaust treatment elements being a particle minimizing (PM) catalyst element; and, wherein various second exhaust treatment elements can be installed alternatively and replaceably in the second housing, at least one of the second exhaust treatment elements being; a wall-flow particulate filter element, a PM catalyst element, a muffler element or an oxidation catalyst element, wherein said second housing of said second module contains at least one pre-oxidation catalyst element being arranged upstream from the at least one second exhaust treatment element, wherein said second housing of said second module contains at least one post-oxidation catalyst element being arranged downstream from the at least one second exhaust treatment element, wherein said second housing has a central section arranged between an exhaust outlet section having said second exhaust outlet and an exhaust inlet section having said second exhaust inlet, said central section being replaceably mounted on said exhaust inlet section and said exhaust outlet section by said first and second quick-acting fastening elements and containing the at least one second exhaust treatment element, and wherein said first housing contains a muffler chamber filled with muffler material, said muffler chamber being arranged between an inlet chamber and an outlet chamber.

24. The modular system according to claim 23, wherein the first module is a SCR module, the first housing is a SCR housing, the second module is a particulate filter (PF) module and the second housing is a PF housing.

* * * * *